Feb. 27, 1968 A. F. NAYLOR 3,371,333
BINARY-TO-DIGITAL CONVERSION SYSTEM
Filed Nov. 12, 1963 7 Sheets-Sheet 1

| WHEEL | ROTOR POSITION |
|---|---|
| 0 | 60° |
| 2 | 90° |
| | 120° |
| | 150° |
| 7 | 180° |
| 5 | 210° |
| 4 | 240° |
| 6 | 270° |
| 8 | 300° |
| 9 | 330° |
| 3 | 0° |
| 1 | 30° |

30

INVENTOR.
ARTHUR F. NAYLOR
BY Wood, Gust & Irish
ATTORNEYS

FIG. 2

| CHARACTER | SWITCH POSITION Y | X | Z | W | FIELD | ROTOR POSITION |
|---|---|---|---|---|---|---|
| 0 | 0 | 0 | 0 | 0 | c → ↑a | 60° |
| 1 | 0 | 0 | 0 | 1 | a ↑ ←c | 30° |
| 2 | 0 | 0 | 1 | 0 | c → | 90° |
| 3 | 0 | 0 | 1 | 1 | a ↑ | 0° |
| | 0 | 1 | 0 | 0 | c → ↓b | 120° |
| | 0 | 1 | 0 | 1 | b ↓ →c | 150° |
| | 0 | 1 | 1 | 0 | c → | 90° |
| | 0 | 1 | 1 | 1 | b ↓ | 180° |
| 8 | 1 | 0 | 0 | 0 | a ↑ ← d | 300° |
| 9 | 1 | 0 | 0 | 1 | a ↑ ← d | 330° |
| | 1 | 0 | 1 | 0 | ← d | 270° |
| | 1 | 0 | 1 | 1 | a ↑ | 0° |
| 4 | 1 | 1 | 0 | 0 | b ↓ ← d | 240° |
| 5 | 1 | 1 | 0 | 1 | d ← ↓b | 210° |
| 6 | 1 | 1 | 1 | 0 | d ← | 270° |
| 7 | 1 | 1 | 1 | 1 | b ↓ | 180° |

INVENTOR.
ARTHUR F. NAYLOR
BY Hood, Gust + Irish
ATTORNEYS

Feb. 27, 1968 A. F. NAYLOR 3,371,333

BINARY-TO-DIGITAL CONVERSION SYSTEM

Filed Nov. 12, 1963 7 Sheets-Sheet 3

INVENTOR.
ARTHUR F. NAYLOR

BY Hood, Gust & Irish

ATTORNEYS

Feb. 27, 1968 A. F. NAYLOR 3,371,333

BINARY-TO-DIGITAL CONVERSION SYSTEM

Filed Nov. 12, 1963 7 Sheets-Sheet 4

INVENTOR.
ARTHUR F. NAYLOR

BY Hood, Gust & Irish

ATTORNEYS

FIG. 7

| CHARACTER | SWITCH POSITION W | X | Y | Z | FIELD | ROTOR POSITION |
|---|---|---|---|---|---|---|
| 0 | 0 | 0 | 0 | 0 | a b c | 0° |
| 1 | 0 | 0 | 0 | 1 | a b c | 180° |
| 2 | 0 | 0 | 1 | 0 | b c | 30° |
| 3 | 0 | 0 | 1 | 1 | b c | 210° |
| 4 | 0 | 1 | 0 | 0 | a c | 330° |
| 5 | 0 | 1 | 0 | 1 | a c | 150° |
| 6 | 1 | 0 | 1 | 0 | a b c | 60° |
| 7 | 1 | 0 | 1 | 1 | a b c | 240° |
| 8 | 1 | 1 | 0 | 0 | a b c | 300° |
| 9 | 1 | 1 | 0 | 1 | a b c | 120° |

INVENTOR.
ARTHUR F. NAYLOR
BY Hood, Gust + Irish
ATTORNEYS

| WHEEL | ROTOR POSITION |
|---|---|
| 0 | 0° |
| 2 | 30° |
| 6 | 60° |
| | 90° |
| 9 | 120° |
| 5 | 150° |
| 1 | 180° |
| 3 | 210° |
| 7 | 240° |
| | 270° |
| 8 | 300° |
| 4 | 330° |

30

INVENTOR.
ARTHUR F. NAYLOR
BY Hood, Gust & Irish
ATTORNEYS

INVENTOR.
ARTHUR F. NAYLOR
BY Hood, Gust + Irish
ATTORNEYS 3,371,333

BINARY-TO-DIGITAL CONVERSION SYSTEM

Arthur F. Naylor, Fort Wayne, Ind., assignor to Bowmar Instrument Corporation, Fort Wayne, Ind., a corporation of Indiana Filed Nov. 12, 1963, Ser. No. 322,678
13 Claims. (Cl. 340—347)

ABSTRACT OF THE DISCLOSURE

A code converter for use in a binary-to-decimal converting system comprising a magnetic multiple position indicator having a magnetic rotor and a magnetic stator structure cooperating therewith. Either three or four selectively energizable field winding parts are annularly and symmetrically disposed on the stator structure for selectively positioning the rotor at twelve different discrete rotor positions. Means are provided for selectively coupling predetermined ones of the field winding parts to direct current potential supply means for energization thereby with predetermined positive or negative polarity in accordance with a prearranged code which has a plurality of characters no greater than twelve. The coupling means and the field winding parts are arranged so that predetermined groups of the windings are energized with predetermined polarities and are jointly effective to provide a corresponding number of different discrete rotor positions.

This invention relates generally to systems for converting information from binary coded form to alpha-numeric form, and more particularly to a system for converting numerical information from binary coded form to digital form.

It is well known to transmit alphabetical and numerical information in the form of a binary code, each character of the code corresponding to a respective letter or numeral being formed of "zero" and "one" character bits. It is frequently desirable to convert or decode the binary coded information to its original alpha-numerical form for direct reading, and this has generally been accomplished by complex switching matrices which illuminate lamps arranged in a pattern to form the proper letter or numeral corresponding to the respective coded character. While conversion of numerical information alone from binary coded form to digital form is frequently all that is required, systems for such binary-to-digital conversion have nonetheless required complex logic conversion apparatus such as diode matrices, and complex lamp or other direct reading apparatus energized by the logic conversion apparatus.

It is an object of my invention to provide an improved binary-to-digital conversion system.

Another object of my invention is to provide an improved system for converting numerical information from binary coded form to digital form characterized by its simplicity.

A further object of my invention is to provide an improved system for converting numerical information from binary coded form to digital form which does not require a switching matrix.

Yet another object of my invention is to provide an improved system for converting numerical information from binary coded form to digital form which does not require the use of a pattern of lamps for the read-out display.

Further objects and advantages of the invention will become apparent by reference to the following description and the accompanying drawings, and the features of novelty which characterize the invention will be pointed out with particularity in the claims annexed to and forming a part of this specification.

Stepping motors and remote magnetic multiple position indicators, such as devices of the Gramme ring type, are well known; such devices may be employed for indicating a plurality of different rotational positions in response to selective energization of their field windings. In accordance with the invention, such a device is employed having rotor means and selectively energizable means for positioning the rotor means at a plurality of different rotational positions. Logic converting means is provided comprising first means for providing a part of the binary-to-digital conversion including means for selectively energizing the positioning means respectively in accordance with the characters of the binary code. The remaining part of the logic conversion is provided by indicator means coupled to the rotor means and operatively driven thereby for indicating the rotational position thereof, the indicator means having digits displayed thereon in a predetermined sequence respectively to indicate the digits corresponding to the characters of the code.

In the drawing:

FIG. 2 is a chart showing the mode of operation of the system of FIG. 1;

FIG. 7 is a chart useful in explaining the operation of the system of FIG. 6;

Figures 1, 3:
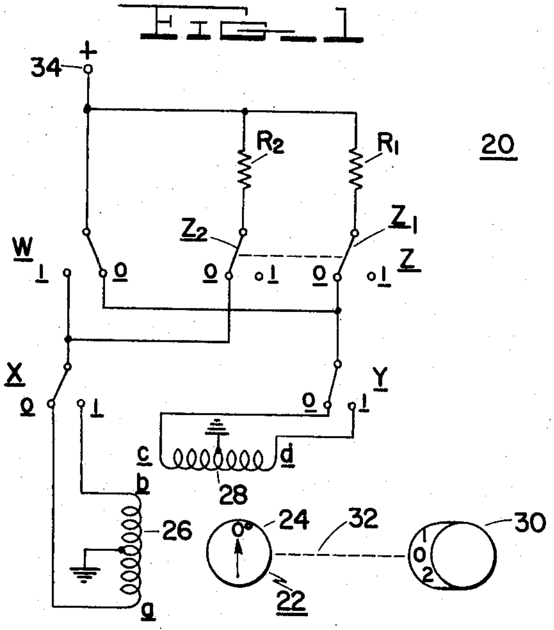
FIG. 1 is a simplified schematic diagram showing one embodiment of the invention.
FIG. 3 is a diagram showing the arrangement of the numerals on the indicator wheel of the system of FIG. 1 to provide the final part of the logic conversion.

Referring now to FIG. 1, there is shown schematically an embodiment of the invention, generally indicated at 20 employing a magnetic multiple position indicator 22, which may be of the type illustrated in FIG. 5 and hereinafter more fully described. Indicator 22 comprises a magnetic stator core which cooperates with a magnetic rotor 24, which may be permanent magnet-excited. The stator core of indicator 22 has two field winding sections 26, 28 disposed thereon in quadrature. Each of the field winding sections 26, 28 is center-tapped to provide winding parts *a*, *b*, and *c*, *d*. In the illustrated embodiment, the center-taps of the field winding sections 26, 28 are grounded, as shown. Rotor 24 is coupled to drive indicator wheel or drum 30, as shown by the dashed line 32.

Four switches identified as *w*, *x*, *y* and *z* are provided, switches *w*, *x*, and *y* each having two positions, respectively identified as 1 and 0. Switch *z* has two sections *z*1, and *z*2 each having 0 and 1 positions.

The ends of winding sections *a* and *b* of field winding section 26, are respectively coupled to the 0 and 1 positions of switch *x*, and the ends *c* and *d* of field winding section 28 are respectively connected to the 0 and 1 positions of switch *y*. Switch *x* has its movable element connected to position 1 of switch $w$ and to position 0 of switch part $z2$. Switch $y$ has its movable element connected to position 0 of switch $w$ and to position 0 of switch part $z1$. The movable element of switch $w$ is connected to source 34 of direct current voltage and the movable elements of switch parts $z1$ and $z2$ are respectively connected to source 34 by dropping resistors R1 and R2.

Figure 5:
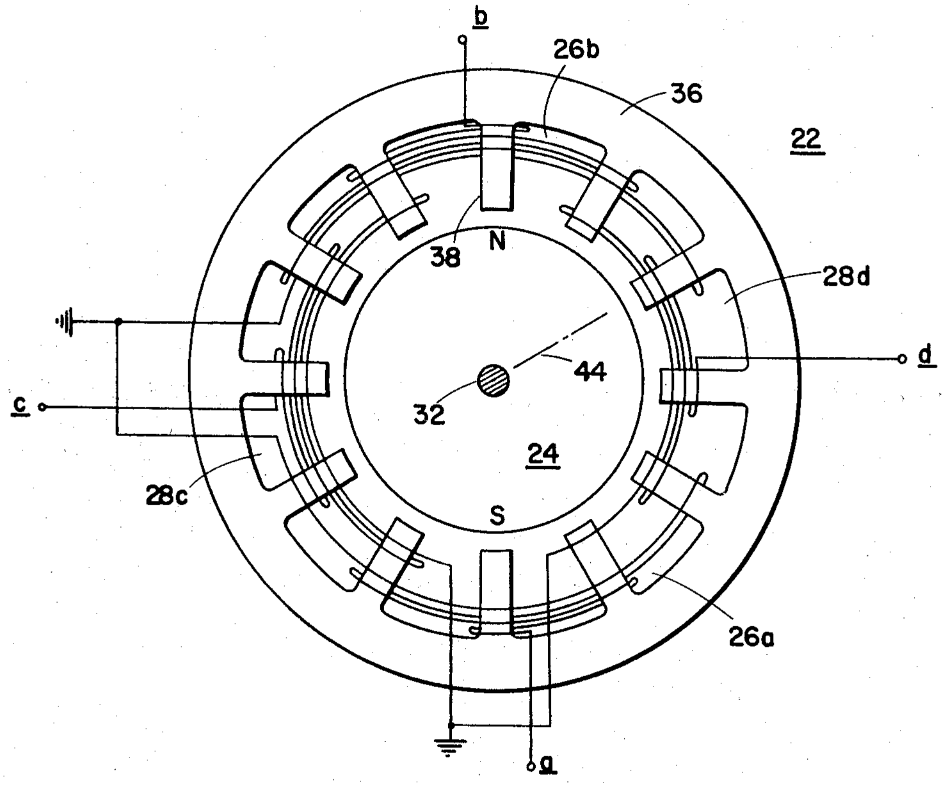
FIG. 5 is a schematic diagram of a magnetic rotation position indicating device suitable for use in the system of FIG. 1.

Referring briefly to FIG. 5, the magnetic multiple position indicator 22 may comprise a stator core member 36 formed of a stacked plurality of relatively thin laminations of suitable magnetic material and having twelve radially inwardly extending teeth 38 defining an air gap with rotor member 24. Rotor member 24 may be formed of suitable permanent magnet material radially polarized, as shown.

It will readily be seen that the field winding parts 26*a*, 26*b* are respectively distributed on two diametrically opposite groups of five teeth and likewise that the field winding parts 28*c*, 28*d* are respectively distributed on two groups of five teeth, the respective axes of the field winding sections 26, 28 being in quadrature, i.e., at right angles, as shown.

It will now be readily seen that selective energization of various ones of the field winding parts of the magnetic multiple position indicator 22 will result in selectively rotational positioning the rotor 24 at different rotational positions. For example, connecting the end $b$ of winding part 26*b* to a source of positive potential will position rotor 24 as shown in FIG. 5 whereas connection of the end $a$ of section 26*a* will reverse the rotational position of rotor 24 from that shown. It will further be seen that if the end $b$ of winding part 26*b* is coupled to a source of positive potential and end $d$ of winding part 28*d* is likewise coupled to a source of positive potential but of half the voltage of that to which end $b$ of winding part 26*b* is connected, rotor 24 will be positioned 30° clockwise from the position shown in FIG. 5 as indicated by the dashed line 44 in FIG. 5.

Referring now additionally to FIG. 2, it will be seen that the four two-position switches $y$, $x$, $z$, and $w$ respectively correspond to the four character bits of a code conveying numerical information, i.e., from "zero" to "nine." Thus, each of the switches $y$, $x$, $z$, and $w$ in its 0 position corresponds to a respective "zero" character bit, and its 1 position corresponds to a "one" character bit.

In FIG. 2, there is shown all of the permutations of four "0" and "1" character bits, together with the numerals "zero" to "nine" respectively corresponding to certain of the binary code combinations in a binary code for conveying numerical information which will allow proper operation with a conventional binary code; specifically, $w$ pertains to the "one's" bit, $z$ pertains to the "two's" bit, $x$ pertains to the "four's" bit and $y$ is shown as a logical "one" if a logical "one" appears either in the "four's" bit or the "eight's" bit.

Referring now to the numeral "zero," it will be seen that this corresponds to the binary code 0, 0, 0, 0. Thus, when the switches $y$, $x$, $z$, and $w$ are all in their 0 positions, they correspond to the binary code for the numeral "zero." Inspection of FIG. 1 will reveal that when each of the switches is in its 0 position, field winding part 28*c* is directly coupled to source 34 and that field winding part 26*a* is coupled to source 34 in series with dropping resistor R2. At this point, it is observed that the dropping resistors R1, R2 are proportioned to apply to the respective field winding parts an energizing voltage .577 that which is applied when the parts are directly coupled to the source 34. It will now be seen that when the field winding parts 28*c* and 26*a* are so energized, the rotor 24 will be positioned 60° clockwise with reference to the 0° position, as shown by the arrow in FIG. 1. Likewise, it is seen that the binary code for the numeral "one" is 0, 0, 0, 1 and that with the switches correspondingly positioned, field winding part 26*a* will be directly coupled to the source 34 and field winding part 28*c* coupled thereto in a series with resistor R1 to position rotor 24 30° clockwise with respect to the 0° position.

It will be seen that a number of the binary code characters theoretically provide redundant rotational positions for the rotor 24, however, redundancy is not actually provided since all of the permutations of the four "0" and "1" bits are not utilized for the numerals "zero" to "nine." It will, however, be observed that in the illustrated embodiment, the rotational positions of 120° and 150° do not correspond to any numeral. It will further be observed that the rotational positions of the rotor 24 do not progress in the same sequence as the corresponding numerals. Thus, while the 0° position of the rotor corresponds to the numeral "three," the numeral "four" provides a 240° position for the rotor. For this reason, the logic conversion provided by the selected positioning of the switches $y$, $x$, $z$ and $w$ is not complete.

In accordance with the invention, the final part of the logic conversion is provided by the arrangement of the digits displayed on the indicator wheel 30 as shown in FIG. 3; it will be observed that the sequence of digits on the indicator wheel 30 is arranged correctly to correspond to the rotor positions for the respective characters of the binary code.

Figure 4:
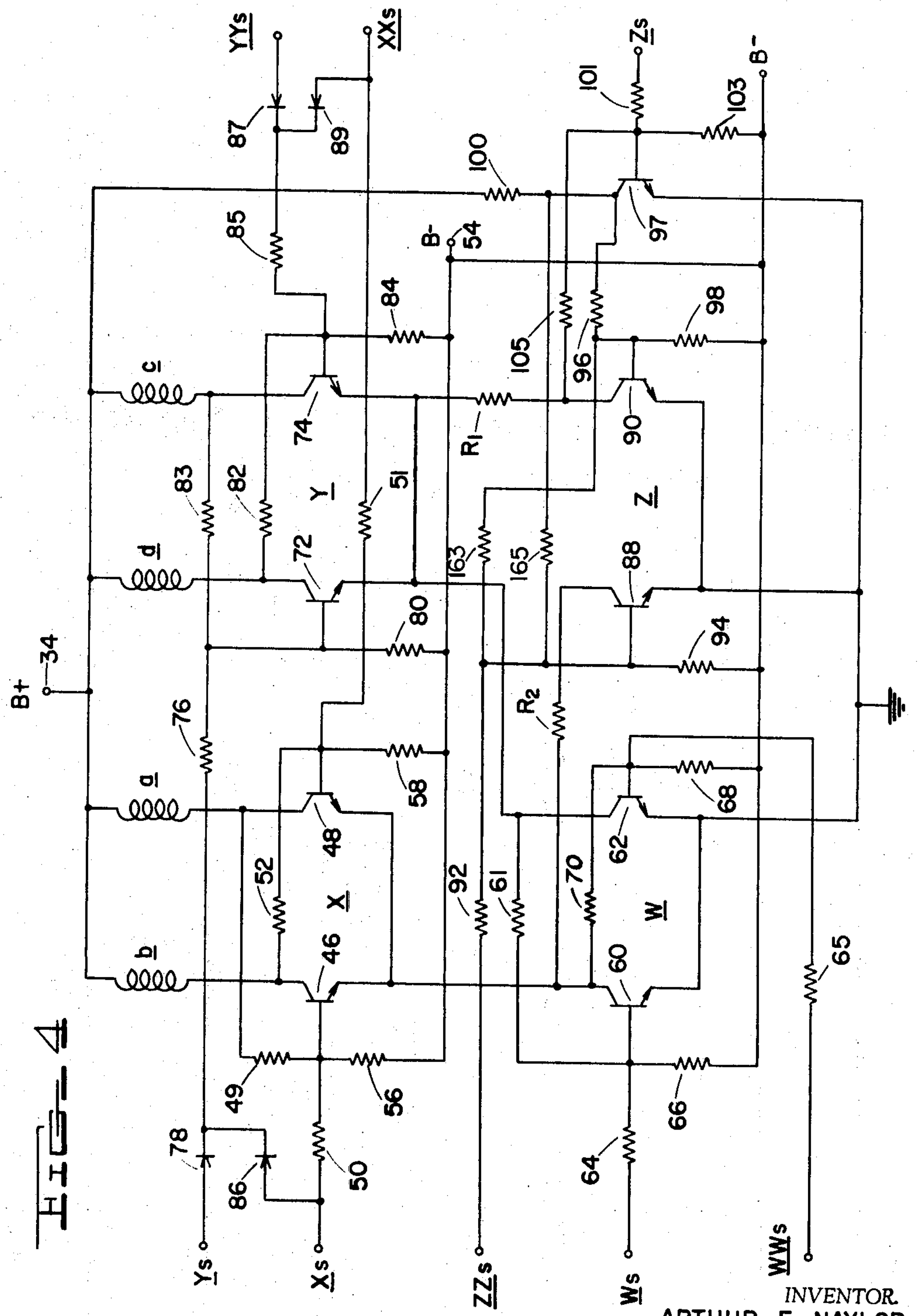
FIG. 4 is a schematic diagram of the system of FIG. 1 employing transistorized switches for operation from four signal lines.

A binary code is most commonly employed in the form of "ON" and "OFF" signals provided on respective signal lines. Thus to carry a binary code for conveying numerical information, eight signal lines are required. Referring now to FIG. 4, there is shown a circuit in accordance with the system of FIG. 1 in which the switches $y$, $x$, $z$ and $w$ take the form of multivibrators respectively connected to receive the "1" bits of binary coded signals on the four signal lines *ys*, *xs*, *zs*, and *ws*, and the "0" bits on lines *yys*, *xxs*, *zzs*, and *wws*.

Here, switch $x$ comprises transistors 46 and 48, transistor 46 when conducting corresponding to the 1 position of switch $x$ in FIG. 1 and transistor 48, when conducting, corresponding to the 0 position. The collectors for transistors 46 and 48 are respectively connected to one end of winding sections 26*b* and 26*a*, which have their other ends connected to source 34. The base of transistor 46 is connected to the collector of transistor 48 by resistor 49 and to signal line *xs* by resistor 50 and the base of transistor 48 is connected to the signal line *xxs* by resistor 51 and to the collector of transistor 46 by resistor 52. The bases of transistors 46 and 48 are respectively connected to a suitable source 54 of negative potential by base bias resistors 56 and 58. The emitters of transistors 46 and 48 are connected to the collector of transistor 60 of switch $w$ which has its emitter connected to ground, as shown. It will now be seen that transistors 46 and 48 of $x$ together with their associated resistors provide a conventional bistable multivibrator configuration so that the occurrence of a positive going "1" character bit on line *xs* will turn transistor 46 on and transistor 48 off thus energizing winding part 26*b* and deenergizing winding part 26*a*. Likewise, the occurrence of a "0" bit on line *xxs* will turn transistor 48 on and transistor 46 off.

Switch $w$ similarly comprises transistors 60 and 62 with the base of transistor 60 being connected to signal line *ws* by resistor 64, to the collector of transistor 62 by resistor 61 and to the source 54 of negative potential by base bias resistor 66. The base of transistor 62 is connected to signal line *wws* by resistor 65 and to source 54 by base bias resistor 68 and to the collector of transistor 60 by resistor 70. The emitters of transistors 60, 62 are connected to ground, as shown. Here, transistor 60 when conducting, corresponds to the 1 position of switch $w$ of FIG. 1 and transistor 62 when conducting, corresponds to the 0 position.

Switch $y$ similarly comprises transistors 72, 74 having field winding parts 28*d* and 28*c* respectively connected thereto and to source 34, as shown. The base of transistor 72 is connected to signal line *ys* by resistor 76 and diode 78, to source 54 by resistor 80, and to the collector of transistor 74 by resistor 83. The base of transistor 74 is connected to signal line *yys* by resistor 85 and diode 87, to the collector of transistor 72 by resistor 82 and to source 54 by base bias resistor 84. The emitters of transistors 72, 74 are connected together and to the collector of transistor 62. Transistor 72 when conducting corresponds to the 1 position of switch *y* of FIG. 1 and transistor 74 corresponds to the 0 position. Other diodes 86 and 89 respectively connect input line *xs* and input line *ys*, and input lines *xxs* and *yys*, as shown, in order to accomplish the logic combination referred to above for operation with a conventional binary code input, i.e., *y* is a logical "one" if a logical "one" appears in either the "fours" bit or the "eights" bit.

Switch *z* comprises two transistors 88 and 90 which respectively correspond to switch parts *z2* and *z1* of FIG. 1. Transistor 88 has its base connected to signal line *zzs*, by resistor 92 and to the negative source 54 by resistor 94. Transistor 90 has its base connected to the collector of transistor 97 by resistor 96 to source 54 by resistor 98, and to line *zzs* through resistor 163 for turning on switch *z1* with a 0 pulse. The emitters of transistors 88 and 90 are respectively connected to ground, as shown. The collector of transistor 88 is connected to the emitters of transistor 46, 48 of switch *x* by dropping resistor R2 and the collector of transistor 90 is connected to the emitters of transistors 72, 74 of switch *y* by dropping resistor R1. Transistor 97 has its collector connected to source 34 by resistor 100 and to the base of transistor 88 by resistor 165 for turning off switch *z2*, and has its emitter connected to ground, as shown. The base of transistor 97 is connected to signal line *zs* by resistor 101, to the negative source 54 by resistor 103, and to the collector of transistor 90 by resistor 105.

Comparison of the circuits of FIG. 1 and FIG. 4 will reveal that they are essentially the same circuits, transistorized switches actuated by "0" and "1" character bit signals on eight signal lines, being substituted for the switches *w, x, y*, and *z* schematically shown in FIG. 1. It will now be seen that the logic conversion of numerical information from binary coded form to digital form is accomplished with the system of FIG. 4 by nine transistors and four diodes, in contrast with the complex matrix and indicator lamp systems commonly employed to effect such conversion.

Figure 6:
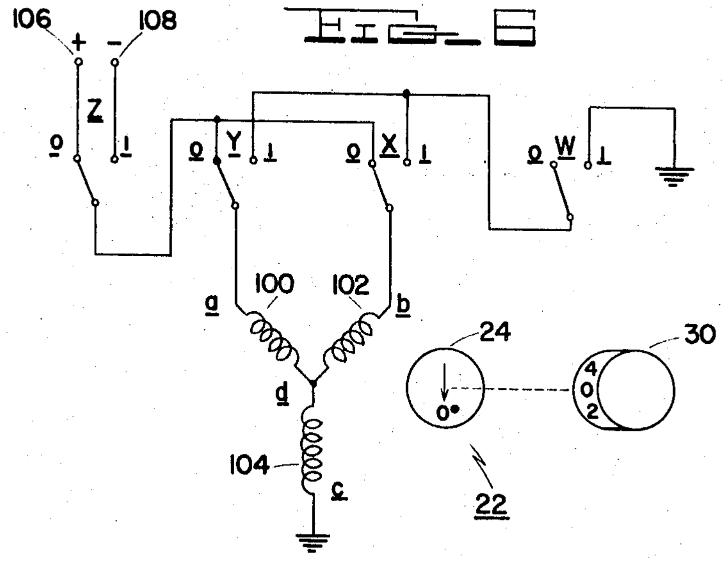
FIG. 6 is a simplified schematic diagram of another system in accordance with the invention.

Referring now to FIG. 6 in which like elements are indicated by like reference characters, there is shown another embodiment of the invention in which the magnetic multiple position indicator 22 is provided with three windings 100, 102, and 104 having their ends *d* connected together to form a Y-configuration. Field winding parts 100, 102, and 104 are distributed in angularly spaced relationship upon the poles of a magnetic stator core member, which may have twelve whole teeth, in known fashion.

In the illustrated embodiment, end *c* of winding part 104 is grounded and the ends *a* and *b* of winding parts 100, 102 respectively, are connected to the movable elements of switches *y* and *x*. Switch *z* respectively has its 0 and 1 positions connected to source 106, 108 of positive and negative potential, and its movable element connected to the 0 position of switches *y* and *x*. The 1 positions of switches *y* and *x* are connected to the movable element of switch *w*. The 1 position of switch *w* is connected to ground and its 0 position is unconnected, as shown.

It will now be readily seen that the rotor 24 of the magnetic multiple position indicator 22 of FIG. 6 will assume different discrete rotational positions in response to selective energization of different predetermined ones of the field winding sections 100, 102, 104, and the polarity of the energizing voltage applied thereto.

Referring now additionally to FIG. 7 in which a modified binary code is shown, it will be seen that for the numeral zero, the binary code is now 0, 0, 0, 0 and thus that each of the switches *w, x, y* and *z* of FIG. 6 will be in the 0 position. It will be seen that in this switch position, field winding parts 100, 104 are serially connected across the positive source of potential 106, and that the field winding parts 102, 104 are likewise serially connected across the positive source 106 to provide a resultant 0° rotor position, as shown by the arrow in FIG. 6. Inspection of FIG. 7 will reveal the various switch positions for the binary characters corresponding to the numerals "one" to "nine," the field winding parts which are energized for each binary character, the polarity of energization, and the resulting rotor position.

Figures 8, 11:
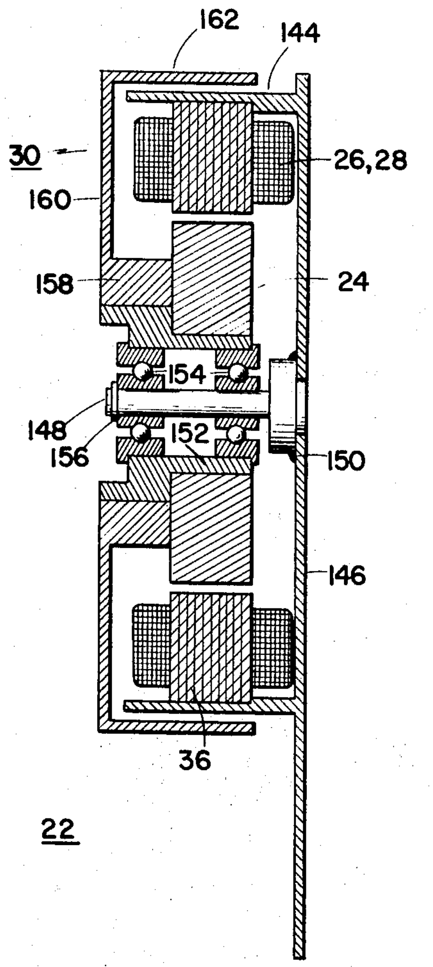
FIG. 8 is a diagram showing the arrangement of the digits on the indicating wheel on the system of FIG. 6.
FIG. 11 is a cross-sectional view of the connection of the indicator wheel to the magnetic rotation position indicating device of FIGS. 1 and 6.

Referring now additionally to FIG. 8, it will be seen that in common with the embodiment of FIG. 1, the sequence of rotor positions does not correspond to the sequence of numerals "zero" to "nine" and thus, that selective energization of field winding parts 100, 102, 104 by the switches *w, x, y* and *z* will provide only a part of the requisite logic conversion, the remaining part again being provided by rearrangement of the digits displayed on the indicator wheel 30; it will here be observed that the rotational positions of 90° and 270° of the rotor 24 do not correspond to any numeral in the binary code.

Figure 9:
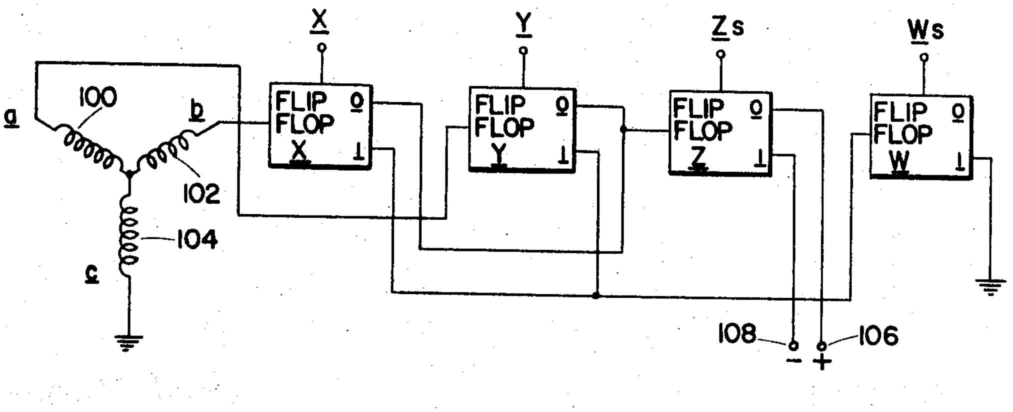
FIG. 9 is a schematic diagram showing the system of FIG. 6 employing bistable switching devices for operation from four signal lines.

Referring now to FIG. 9 in which like elements are again indicated by like reference characters, a system is shown in which bistable switching devices are employed for the switches *w, x, y* and *z* of FIG. 6, these switches being respectively connected to binary code signal lines *ws, xs, ys* and *zs*. Here, the bistable switches *w, x, y* and *z* may respectively be transistorized bistable multivibrators of the type employed for switches *w, x*, and *y* of the embodiment of FIG. 4. For example, assuming substitution of the bistable multivibrator *x* of FIG. 4 comprising the transistors 46, 48, the input lines indicated as 0 and 1 for the switch *x* of FIG. 9 will be connected respectively to the collectors of the transistors 48, 46 of FIG. 4, the signal line *xs* will be connected again to the base of transistor 46, and the two emitters of the transistors 46, 48 would be connected to end *b* of winding part 102.

A comparison of FIGS. 2 and 7 will reveal that the binary code shown in FIG. 7 differs from the conventional or standard binary code shown in FIG. 2. Furthermore, a system employing binary coded information may include not only numerical information, but also alphabetical information, such systems conventionally requiring a total of eight signal lines.

Figure 10:
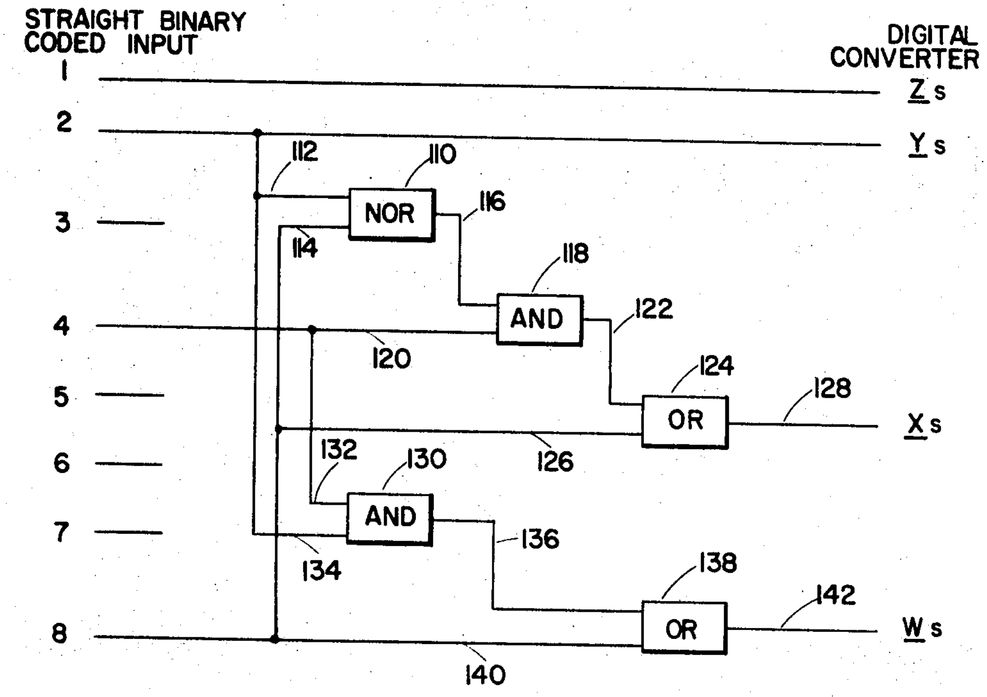
FIG. 10 is a schematic diagram of logic conversion apparatus for converting a standard binary code for use with the system of FIG. 6.

Referring now to FIG. 10 there is shown a logic conversion system for coupling the binary-to-digital conversion system of FIGS. 6, 7, 8 and 9 to an eight line binary system employing a standard alpha-numeric binary code. In such a system, binary characters corresponding to the numerical information appear on lines one, two, four, and eight of the eight line system. In order to effect the requisite conversion of the standard binary code to the special code shown in FIG. 7 and employed by the system of FIGS. 6 and 9, a NOR circuit 110 is provided having its input circuits 112, 114 respectively connected to signal lines two and eight and having its output line 116 coupled to AND circuit 118, which has its other input circuit 120 coupled to signal line four. The output circuit 122 of AND circuit 118 is coupled to OR circuit 124 which has its other input circuit 126 coupled to signal line eight. Output circuit 128 of OR circuit 124 is coupled to the signal lines *xs* of the circuit of FIG. 9.

Another AND circuit 130 is provided having its input circuit 132 connected to signal line "four" and its other input circuit 134 is connected to signal line "two." The output circuit 136 of AND circuit 130 is coupled to OR circuit 138 which has its other input circuit 140 coupled to signal line "eight." Output circuit 142 of OR circuit 138 is coupled to signal line *ws* of the circuit of FIG. 9. Signal lines "one" and "two" are respectively coupled to signal lines *zs* and *ys* of the circuit of FIG. 9.

It will be readily understood that signal lines "three,"

"five," "six" and "seven" which carry alphabetical as opposed to numerical information in binary coded form together with signal lines "one," "two," "four," and "eight," may be connected to conventional logic conversion and alphabetical display apparatus.

Referring now to FIG. 11, there is illustrated a typical construction for the magnetic multiple position indicator 22 of FIG. 5. Here, stator core 36 is mounted within an annular shell 144 which is integrally joined to mounting plate 146. A shaft 148 is provided concentrically disposed within the shell 144 and secured to end plate 146 in any suitable manner, as by welding at 150, as shown. Permanent magnet rotor 24 is concentrically disposed within stator core member 36 and is mounted on a suitable annular sleeve 152. Sleeve 152 is in turn rotatably supported on shaft 148 by suitable anti-friction bearings 154, the rotor 24, sleeve 152, and bearings 154 being held in assembled relation on the shaft 148 by means of a suitable snap ring 156. The indicator wheel 30 is formed of an annular sleeve portion 158 mounted on the annular sleeve 152 and abutting the rotor 24, as shown. An annular disc portion 160 is integrally joined to the annular sleeve portion 158 and has annular drum portion 162 integrally joined to its outer periphery, the drum portion 162 concentrically surrounding the annular mounting shell 144. The digits are in turn displayed on the outer peripheral surface of the drum portion 162.

It will be readily seen that the mechanical construction shown in FIG. 11 is equally suitable for the magnetic multiple position indicator employed in the embodiment of FIGS. 6 and 9. It will further be readily seen that the magnetic multiple position indicator 22, as shown in FIG. 11, may be manufactured in an extremely small size, such as .75 inch in diameter, and that the remaining components of the system of either FIG. 4 or FIG. 9 may be packaged in a comparably small size.

It will now be seen that there has been provided in accordance with the invention, a binary-to-digital conversion system which is characterized by its simplicity and which lends itself to extreme miniaturization, the system eliminating the complex logic converting matrices and lamp-illuminated numeric display devices previously employed.

While I have illustrated and described specific embodiments of the invention, further modifications and improvements will occur to those skilled in the art and I desire therefore in the appended claims to cover all modifications which do not depart from the spirit and scope of my invention.

What is claimed is:

1. A code converter comprising a single magnetic rotor; a single magnetic stator structure cooperating with said rotor and including three only selectively energizable field winding parts angularly and symmetrically displaced on said stator structure for selectively positioning said rotor at a plurality of different discrete rotational positions, there being twelve of said discrete rotor positions; direct current potential supply means; and means for selectively coupling predetermined ones of said windings to said supply means for energization thereby with a predetermined positive or negative polarity in accordance with a prearranged code having a plurality of characters no greater than twelve; said coupling means and winding parts being arranged so that predetermined groups of two of said windings are energized in series with predetermined polarities respectively in response to a first predetermined number of said characters and are jointly effective to provide a corresponding number of different discrete rotor positions; said coupling means and windings being further arranged so that predetermined ones of said windings are energized in series with the remaining two windings and with predetermined polarities respectively in response to the remaining number of said characters, all of said windings being jointly effective to provide a corresponding number of different discrete rotor positions.

2. The code converter of claim 1 wherein said rotor includes a radially polarized permanent magnet, said stator structure including a magnetic core surrounding said permanent magnet and having twelve winding slots defined by twelve teeth, said winding parts being distributed in said slots.

3. The code converter of claim 1 wherein said coupling means includes switching means having a plurality of parts selectively actuable to couple said windings to said source respectively in response to said characters.

4. The code converter of claim 3 wherein said switching means includes four parts.

5. The code converter of claim 1 wherein said three field winding parts are Y-connected.

6. A binary-to-decimal converter for converting ten digit numerical information from a four bit binary code to decimal form and for displaying the same comprising: motor means comprising a single magnetic rotor, and a single magnetic stator structure cooperating with said rotor and including field winding means having a plurality of selectively energizable parts angularly displaced on said stator structure for selectively positioning said rotor means at a plurality of different discrete rotational positions in response to selective energization of said parts, there being at least three and less than five of said parts and, there being at least ten of said discrete rotor positions; binary input circuit means including logic converting switching means having four parts coupled to said field winding means for selectively energizing different predetermined ones of said parts thereof in response to different respective characters of said code thereby providing a different said discrete rotor means position for each said character, said discrete rotor positions progressing in a sequence other than numerical in response to progression of said characters in numerical sequence whereby said switching means provides only a part of the binary-to-decimal conversion; rotatable indicator means coupled to said rotor and operatably driven thereby for indicating said discrete rotational positions of said rotor, said indicator means having digits from "zero" to "nine" displayed thereon in the same sequence as said sequence of discrete rotor positions thereby providing the remaining part of said conversion; a source of direct current voltage; and at least one resistance, said switching means having a plurality of positions, said switching means in each position thereof coupling a predetermined one of said winding means parts directly across said source in a predetermined sense, said switching means in predetermined positions thereof serially coupling another predetermined one of said winding means parts and said resistance across said source in a predetermined sense thereby energizing said other winding means part with a voltage lower than that of said source.

7. A binary-to-decimal converter for converting ten digit numerical information from a four bit binary code to decimal form and for displaying the same comprising: motor means comprising a single magnetic rotor, and a single magnetic stator structure cooperating with said rotor and including field winding means having a plurality of selectively energizable parts angularly displaced on said stator structure for selectively positioning said rotor means at a plurality of different discrete rotational positions in response to selective energization of said parts, there being at least three and less than five of said parts and, there being at least ten of said discrete rotor positions; binary input circuit means including logic converting switching means having four parts coupled to said field winding means for selectively energizing different predetermined ones of said parts thereof in response to different respective characters of said code thereby providing a different said discrete rotor means position for each said character, said discrete rotor positions progressing in a sequence other than numerical in response to progression of said characters in numerical sequence whereby said switching means provides only a part of the binary-to-decimal conversion; rotatable indicator means coupled to said rotor and operatably driven thereby for indicating said discrete rotational position of said rotor, said indicator means having digits from "zero" to "nine" displayed thereon in the same sequence as said sequence of discrete rotor positions thereby providing the remaining part of said conversion; and a source of direct current voltage, said switching means having a plurality of positions, said switching means in each position thereof serially coupling a predetermined two of said winding means parts across said source in a predetermined sense, said switching means in predetermined positions thereof serially coupling one of the respective two winding means parts and another winding means part across said source in the respective sense.

8. A binary-to-decimal converter for converting ten digit numerical information from a four bit binary code to decimal form and for displaying the same comprising: motor means comprising a single magnetic rotor, and a single magnetic stator structure cooperating with said rotor and including field winding means having a plurality of selectively energizable parts angularly displaced on said stator structure for selectively positioning said rotor means at a plurality of different discrete rotational positions in response to selective energization of said parts, there being at least three and less than five of said parts and, there being at least ten of said discrete rotor positions; binary input circuit means including logic converting switching means having four parts coupled to said field winding means for selectively energizing different predetermined ones of said parts thereof in response to different respective characters of said code thereby providing a different said discrete rotor means position for each said character, said discrete rotor positions progressing in a sequence other than numerical in response to progression of said characters in numerical sequence whereby said switching means provides only a part of the binary-to-decimal conversion; rotatable indicator means coupled to said rotor and operatably driven thereby for indicating said discrete rotational positions of said rotor, said indicator means having digits from "zero" to "nine" displayed thereon in the same sequence as said sequence of discrete rotor positions thereby providing the remaining part of said conversion; a source of direct current voltage; and two resistors; said winding means having two sections, said sections being respectively center-tapped to define four of said parts, said center taps being respectively coupled to one side of said source, each of said switching means parts having two positions, said switching means parts directly coupling one of said winding means parts to the other side of said source for each of said characters thereby energizing said one winding means part with the voltage of said source, said switching means parts serially coupling another one of said winding means parts and one of said resistors to said other side of said source for predetermined ones of said characters, said resistors being proportioned so that said other one of said winding means parts is energized with a voltage approximately half of said source.

9. A binary-to-decimal converter for converting ten digit numerical information from a four bit binary code to decimal form and for displaying the same comprising: motor means comprising a single magnetic rotor, and a single magnetic stator structure cooperating with said rotor and including field winding means having a plurality of selectively energizable parts angularly displaced on said stator structure for selectively positioning said rotor means at a plurality of different discrete rotational positions in response to selective energization of said parts, there being at least three and less than five of said parts and, there being at least ten of said discrete rotor positions; binary input circuit means including logic converting switching means having four parts coupled to said field winding means for selectively energizing different predetermined ones of said parts thereof in response to different respective characters of said code thereby providing a different said discrete rotor means positioned for each said character, said discrete rotor positions progressing in a sequence other than numerical in response to progression of said characters in numerical sequence whereby said switching means provides only a part of the binary-to-decimal conversion; rotatable indicator means coupled to said rotor and operatably driven thereby for indicating said discrete rotational positions of said rotor, said indicator means having digits from "zero" to "nine" displayed thereon in the same sequence as said sequence of discrete rotor positions thereby providing the remaining part of said conversion; and two sources of direct current voltage of opposite polarity; said winding means having three parts with one end thereof connected together to form a Y-connection, the other end of one of said winding means parts being coupled to one side of both said sources, each of said switching means parts having two positions, one of said switching means parts in one position thereof being coupled to said one side of both of said sources, said switching means parts coupling the other end of another of said winding means parts to the other side of one of said sources for each of said characters, said switching means parts coupling the other end of the remaining one of said winding means parts to said one side of both of said sources for predetermined ones of said characters.

10. A binary-to-decimal converter for converting ten digit numerical information from a four bit binary code to decimal form and for displaying the same comprising: motor means comprising a single magnetic rotor, and a single magnetic stator structure cooperating with said rotor and including field winding means having a plurality of selectively energizable parts angularly displaced on said stator structure for selectively positioning said rotor means at a plurality of different discrete rotational positions in response to selective energization of said parts, there being at least three and less than five of said parts and, there being at least ten of said discrete rotor positions; binary input circuit means including logic converting switching means having four parts coupled to said field winding means for selectively energizing different predetermined ones of said parts thereof in response to different respective characters of said code thereby providing a different said discrete rotor means position for each said character, said discrete rotor positions progressing in a sequence other than numerical in response to progression of said characters in numerical sequence whereby said switching means provides only a part of the binary-to-decimal conversion; rotatable indicator means coupled to said rotor and operatably driven thereby for indicating said discrete rotational positions of said rotor, said indicator means having digits from "zero" to "nine" displayed thereon in the same sequence as said sequence of discrete rotor positions thereby providing the remaining part of said conversion; said input circuit means further comprising four signal lines for respectively carrying "zero" and "one" signals corresponding to said character bits; a source of direct current voltage; and two resistors; said winding means having two sections, said sections being respectively center-tapped to define four said parts, said center taps being respectively coupled to one side of said source, each of said switching means parts having two positions, said switching means parts directly coupling one of said winding means parts to the other side of said source for each of said characters thereby energizing said one winding means part with the voltage of said source, said switching means parts serially coupling another one of said winding means parts and one of said resistors to said other side of said source for predetermined ones of said characters, said resistors being proportioned so that said other one of said winding means parts is energized with a voltage approximately half of said source, each of said swtiching means parts comprising bistable switching means including means coupled to a respective signal line for actuating said bistable switching means to one of its stable positions responsive to a "one" signal bit and to its other stable position in response to a "zero" signal bit.

11. A binary-to-decimal converter for converting ten digit numerical information from a four bit binary code to decimal form and for displaying the same comprising: motor means comprising a single magnetic rotor, and a single magnetic stator structure cooperating with said rotor and including field winding means having a plurality of selectively energizable parts angularly displaced on said stator structure for selectively positioning said rotor means at a plurality of different discrete rotational positions in response to selective energization of said parts, there being at least three and less than five of said parts and, there being at least ten of said discrete rotor positions; binary input circuit means including logic converting switching means having four parts coupled to said field winding means for selectively energizing different predetermined ones of said parts thereof in response to different respective characters of said code thereby providing a different said discrete rotor means position for each said character, said discrete rotor positions progessing in a sequence other than numerical in response to progression of said characters in numerical sequence whereby said switching means provides only a part of the binary-to-decimal conversion; rotatable indicator means coupled to said rotor and operatably driven thereby for indicating said discrete rotational positions of said rotor, said indicator means having digits from "zero" to "nine" displayed thereon in the same sequence as said sequence of discrete rotor positions thereby providing the remaining part of said conversion; said input circuit means further comprising four signal lines for respectively carrying "zero" and "one" signals corresponding to said character bits; and two sources of direct current voltage of opposite polarity; said winding means having three parts with one end thereof connected together to form a Y-connection, the other end of one of said winding means parts being coupled to one side of both said sources, each of said switching means parts having two positions, one of said switching means parts in one position thereof being coupled to said one side of both of said sources, said switching means parts coupling the other end of another of said winding means parts to the other side of one of said sources for each of said characters, said switching means parts coupling the other end of the remaining one of said winding means parts to said one side of both of said sources for predetermined ones of said characters, each of said switching means parts comprising bistable switching means including means coupled to a respective signal line for actuating said bistable switching means to one of its stable positions responsive to a "one" signal bit and to its other stable position in response to a "zero" signal bit.

12. A binary-to-decimal converter for converting ten digit numerical information from a four bit binary code to decimal form and for displaying the same comprising: motor means comprising a single magnetic rotor, and a single magnetic stator structure cooperating with said rotor and including field winding means having a plurality of selectively energizable parts angularly displaced on said stator structure for selectively positioning said rotor means at a plurality of different discrete rotational positions in response to selective energization of said parts, there being at least three and less than five of said parts and, there being at least ten of said discrete rotor positions; binary input circuit means including logic converting switching means having four parts coupled to said field winding means for selectively energizing different predetermined ones of said parts thereof in response to different respective characters of said code thereby providing a different said discrete rotor means position for each said character, said discrete rotor positions progressing in a sequence other than numerical in response to progression of said characters in numerical sequence whereby said switching means provides only a part of the binary-to-decimal conversion; and rotatable indicator means coupled to said rotor and operatably driven thereby for indicating said discrete rotational positions of said rotor, said indicator means having digits from "zero" to "nine" displayed thereon in the same sequence as said sequence of discrete rotor positions thereby providing the remaining part of said conversion; said rotor having twelve said different discrete positions, said field winding means having three only Y-connected parts.

13. A binary-to-decimal converter for converting ten digit numerical information from a four bit binary code to decimal form and for displaying the same comprising: motor means comprising a single magnetic rotor, and a single magnetic stator structure cooperating with said rotor and including field winding means having a plurality of selectively energizable parts angularly displaced on said stator structure for selectively positioning said rotor means at a plurality of different discrete rotational positions in response to selective energization of said parts, there being at least three and less than five of said parts and, there being at least ten of said discrete rotor positions; binary input circuit means including logic converting switching means having four parts coupled to said field winding means for selectively energizing different predetermined ones of said parts thereof in response to different respective characters of said code thereby providing a different said discrete rotor means position for each said character, said discrete rotor positions progressing in a sequence other than numerical in response to progression of said characters in numerical sequence whereby said switching means provides only a part of the binary-to-decimal conversion; and rotatable indicator means coupled to said rotor and operatably driven thereby for indicating said discrete rotational positions of said rotor, said indicator means having digits from "zero" to "nine" displayed thereon in the same sequence as said sequence of discrete rotor positions thereby providing the remaining part of said conversion; said rotor having twelve said different discrete positions, said field winding means having two sections only, said sections being respectively center-tapped to provide four parts.

References Cited

UNITED STATES PATENTS

| | | | |
|---|---|---|---|
| 2,676,289 | 4/1954 | Wulfsberg | 318—8 |
| 2,823,345 | 2/1958 | Ragland | 318—467 |
| 2,827,626 | 3/1958 | DeMotte | 340—347 |
| 2,930,030 | 3/1960 | Mitsuaki Hirose | 340—347 |
| 3,017,557 | 1/1962 | Amato | 318—467 |
| 3,113,301 | 12/1963 | Templin | 340—347 |
| 3,175,138 | 3/1965 | Kilroy et al. | 340—347 |
| 3,199,006 | 8/1965 | Moreines et al. | 340—347 |
| 3,218,625 | 11/1965 | Knotowicz | 340—324 |

OTHER REFERENCES

IBM Tech. Discl. Bulletin, vol. 2, No. 2, August 1959, pp.7 relied on.

RCA Technical Notes TN No. 279, June 1959, 2 sheets.

MAYNARD R. WILBUR, *Primary Examiner.*

DARYL W. COOK, *Examiner.*

K. R. STEVENS, A. L. NEWAN, J. WALLACE, C. R. EDWARDS, *Assistant Examiners.*